United States Patent
Jeon et al.

(10) Patent No.: US 12,046,930 B2
(45) Date of Patent: Jul. 23, 2024

(54) BATTERY SYSTEM

(71) Applicant: SAMSUNG SDI CO., LTD., Yongin-si (KR)

(72) Inventors: Peelsik Jeon, Yongin-si (KR); Inbeom Jeon, Yongin-si (KR); Seongjin Mun, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 156 days.

(21) Appl. No.: 17/181,338

(22) Filed: Feb. 22, 2021

(65) Prior Publication Data

US 2021/0265844 A1 Aug. 26, 2021

(30) Foreign Application Priority Data

Feb. 25, 2020 (KR) .................. 10-2020-0023000

(51) Int. Cl.
*H01M 10/44* (2006.01)
*H02J 7/00* (2006.01)

(52) U.S. Cl.
CPC ......... *H02J 7/0016* (2013.01); *H01M 10/441* (2013.01); *H02J 7/0031* (2013.01)

(58) Field of Classification Search
CPC ..... H02J 7/0016; H02J 7/0031; H01M 10/441
See application file for complete search history.

(56) References Cited

U.S. PATENT DOCUMENTS

| | | | |
|---|---|---|---|
| 5,644,208 A | 7/1997 | Abiven | |
| 8,710,801 B2 | 4/2014 | Schwartz | |
| 9,954,379 B2 | 4/2018 | Lee | |
| 10,992,164 B2 | 4/2021 | Lebreux | |
| 2008/0157718 A1 | 7/2008 | Ohnuki | |
| 2009/0208821 A1 | 8/2009 | Kosugi et al. | |
| 2011/0285351 A1* | 11/2011 | Fink | H01M 10/46 320/117 |
| 2014/0084864 A1* | 3/2014 | Butzmann | H02H 9/001 320/109 |

(Continued)

FOREIGN PATENT DOCUMENTS

| | | |
|---|---|---|
| CN | 110466387 A | 11/2019 |
| KR | 10-2015-0083739 A | 7/2015 |

(Continued)

OTHER PUBLICATIONS

Korean Office action dated Aug. 27, 2021.

(Continued)

*Primary Examiner* — Drew A Dunn
*Assistant Examiner* — Pamela J Jeppson
(74) *Attorney, Agent, or Firm* — Lee IP Law, P.C.

(57) ABSTRACT

A battery system includes: a first battery module including a plurality of first battery cells; a second battery module including a plurality of second battery cells; a battery disconnection unit connected between the first battery module and the second battery module, the battery disconnection unit including: a first main switch connected in series between the plurality of first battery cells and the plurality of second battery cells; and a precharge switch and a precharge resistor connected in series with each other and connected in parallel with the first main switch.

9 Claims, 2 Drawing Sheets

(56) References Cited

U.S. PATENT DOCUMENTS

2015/0372517 A1* 12/2015 Lee .................. B60L 58/14
                                                320/134
2016/0156205 A1*  6/2016 Lee .................. H02J 7/0031
                                                320/112
2018/0339601 A1* 11/2018 Kruszelnicki ...... B60L 53/16
2019/0245361 A1*  8/2019 Jin .................... H02J 7/0031
2019/0319472 A1* 10/2019 Lebreux ............. H02J 7/0031

FOREIGN PATENT DOCUMENTS

KR    10-2016-0137493 A    11/2016
WO    WO2018/100531 A1     6/2018

OTHER PUBLICATIONS

European Search Report dated Jun. 11, 2021.
Chinese Office Action dated Sep. 15, 2023, of the corresponding CN Patent Application No. 202110212010.1.

* cited by examiner

BATTERY SYSTEM

CROSS-REFERENCE TO RELATED APPLICATION

Korean Patent Application No. 10-2020-0023000, filed on Feb. 25, 2020 in the Korean Intellectual Property Office, and entitled: "Battery System," is incorporated by reference herein in its entirety.

BACKGROUND

1. Field

Embodiments relate to a battery system.

2. Description of Related Art

Secondary batteries having electrical characteristics such as high energy density are variously used in portable devices as well as electric vehicles (EVs) or hybrid electric vehicles (HEVs) driven by electric power. Secondary batteries are attracting attention as a new energy source for eco-friendless and energy efficiency improvement, in that these secondary batteries do not generate by-products caused by the use of energy as well as the primary advantage of dramatically reducing the use of fossil fuels.

Types of secondary batteries that are currently widely used include lithium ion batteries, lithium polymer batteries, nickel cadmium batteries, nickel hydride batteries, and nickel zinc batteries. The operating voltage of this unit secondary battery cell, i.e., a unit battery cell, may be about 2.5 volts (V) to about 4.3 V.

SUMMARY

Embodiments are directed to a battery system, including: a first battery module including a plurality of first battery cells; a second battery module including a plurality of second battery cells; a battery disconnection unit connected between the first battery module and the second battery module, the battery disconnection unit including: a first main switch connected in series between the plurality of first battery cells and the plurality of second battery cells; and a precharge switch and a precharge resistor connected in series with each other and connected in parallel with the first main switch.

A first battery terminal may be connected to the first battery module, a second battery terminal may be connected to the second battery module, and the battery disconnection unit may further include a second main switch connected in series between the plurality of second battery cells and the second battery terminal.

The battery system may further include a battery management system configured to control the first main switch, the second main switch, and the precharge switch.

The first battery module may include a first module management unit configured to monitor the plurality of first battery cells, the second battery module may include a second module management unit configured to monitor the plurality of second battery cells, and the battery management system may transmit or receive data to or from the first module management unit and the second module management unit.

The plurality of first battery cells included in the first battery module and the plurality of second battery cells included in the second battery module may have a same connection configuration.

A rated module voltage of the first battery module and a rated module voltage of the second battery module may have substantially the same magnitude.

BRIEF DESCRIPTION OF THE DRAWINGS

Features will become apparent to those of skill in the art by describing in detail example embodiments with reference to the attached drawings in which.

DETAILED DESCRIPTION

Figure 1:
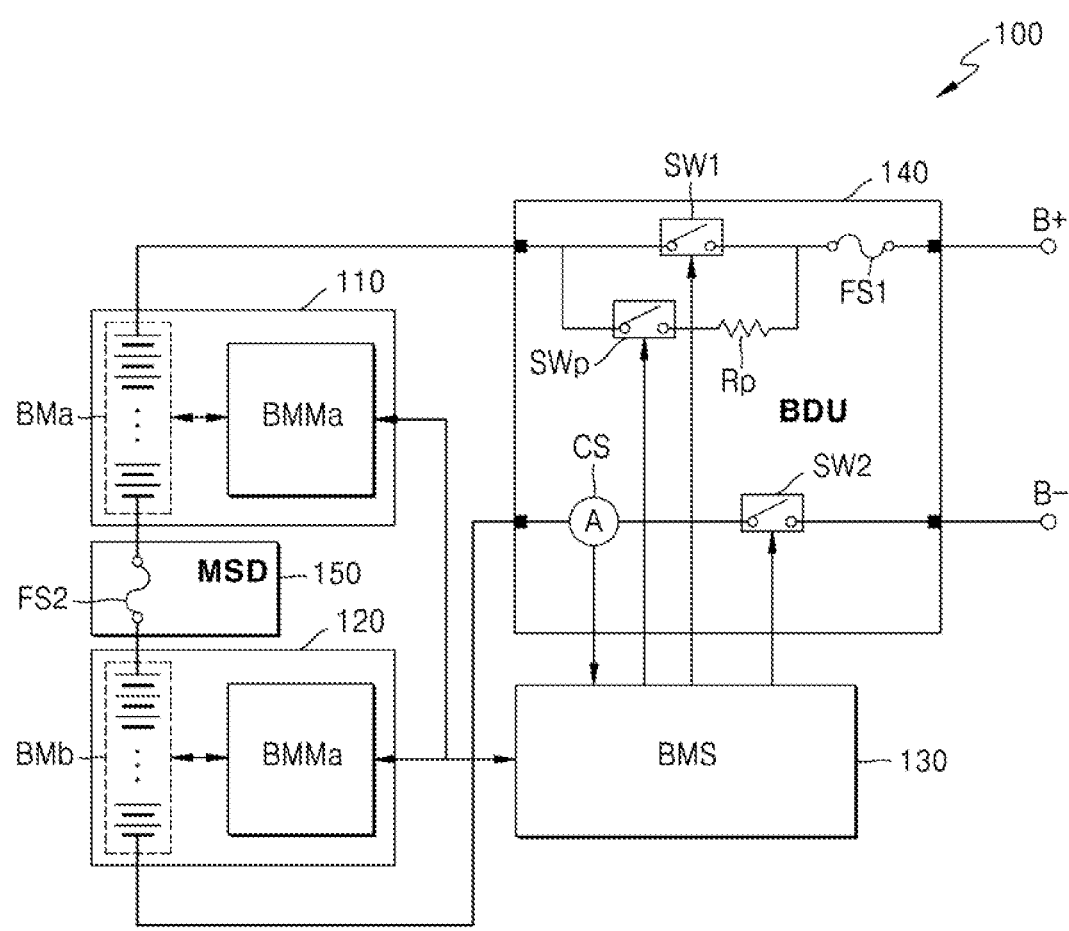
FIG. 1 is a block diagram of a comparative battery system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and the "the" are intended to include the plural forms as well, unless the context clearly indicates otherwise. It will be understood that the terms "comprises" and/or "comprising" used herein specify the presence of stated features or components, but do not preclude the presence or addition of one or more other features or components. It will be understood that although the terms "first," "second," etc., may be used herein to describe various components, these components should not be limited by these terms. These terms are used only to distinguish one component from other components.

FIG. 1 is a block diagram of a comparative battery system.

Referring to FIG. 1, a battery system 100 may include a first battery module 110 and a second battery module 120 connected in series with each other. The first battery module 110 may include first battery cells BMa and a first battery management module BMMa. The second battery module 120 may include second battery cells BMb and a second battery management module BMMb.

The battery system 100 may include a battery disconnection unit (BDU) 140. The battery disconnection unit (BDU) 140 may control a current flow on a high voltage path of the battery system 100, i.e., a path between the first battery module 110 and a first battery terminal B+.

The battery disconnection unit (BDU) 140 may include a first main switch SW1, a precharge switch SWp, a precharge resistor Rp, and a first fuse FS1 arranged on the high voltage path. The battery disconnection unit (BDU) 140 may include a second main switch SW2 and a current sensor CS arranged on a low voltage path, i.e., a path between the second battery module 120 and a second battery terminal B−.

The battery system 100 may include a battery management system (BMS) 130 that transmits/receives data to/from the first and second battery management modules BMMa and BMMb so as to manage the first and second battery modules 110 and 120. The battery management system 130 may control the first and second main switches SW1 and SW2 and the precharge switch SWp, and may receive a signal corresponding to the magnitude of current detected by the current sensor CS.

The battery system 100 may include a manual safety disconnector (MSD) 150. The manual safety disconnector 150 may be arranged between the first battery module 110 and the second battery module 120, and may connect or separate (e.g., isolate) the first battery module 110 and the second battery module 120 to or from each other.

The manual safety disconnector 150 may be connected to contact terminals that may be manually connected or separated to or from each other by a user. For example, the user may manually insert the manual safety disconnector 150 between the contact terminals, thereby connecting the first battery module 110 and the second battery module 120 to each other. The user may manually separate the manual safety disconnector 150 from the contact terminals, so that the first battery module 110 and the second battery module 120 may be separated from each other. The manual safety disconnector 150 may include a second fuse FS2.

A failure may occur in the battery system 100. In this case, the battery system 100 may be disassembled to check the cause of the failure and/or perform a repair. When disassembling the battery system 100, the user may manually separate the manual safety disconnector 150 for safety, and then start disassembling the battery system 100.

The manual safety disconnector 150 may manually disconnect a conductive path between the battery modules 110 and 120 connected in series with each other, thereby providing for the user's safety during disassembling and repairing of the battery system 100 and replacement of the battery modules 110 and 120, and preventing an accident such as a short circuit between the first and second battery modules 110 and 120 that may occur in the battery system 100.

In the case that the manual safety disconnector 150 is provided between the first and second battery modules 110 and 120, the overall cost may be increased, the overall device volume may be increased, and the complexity of the battery system 100 may be increased.

Figure 2:
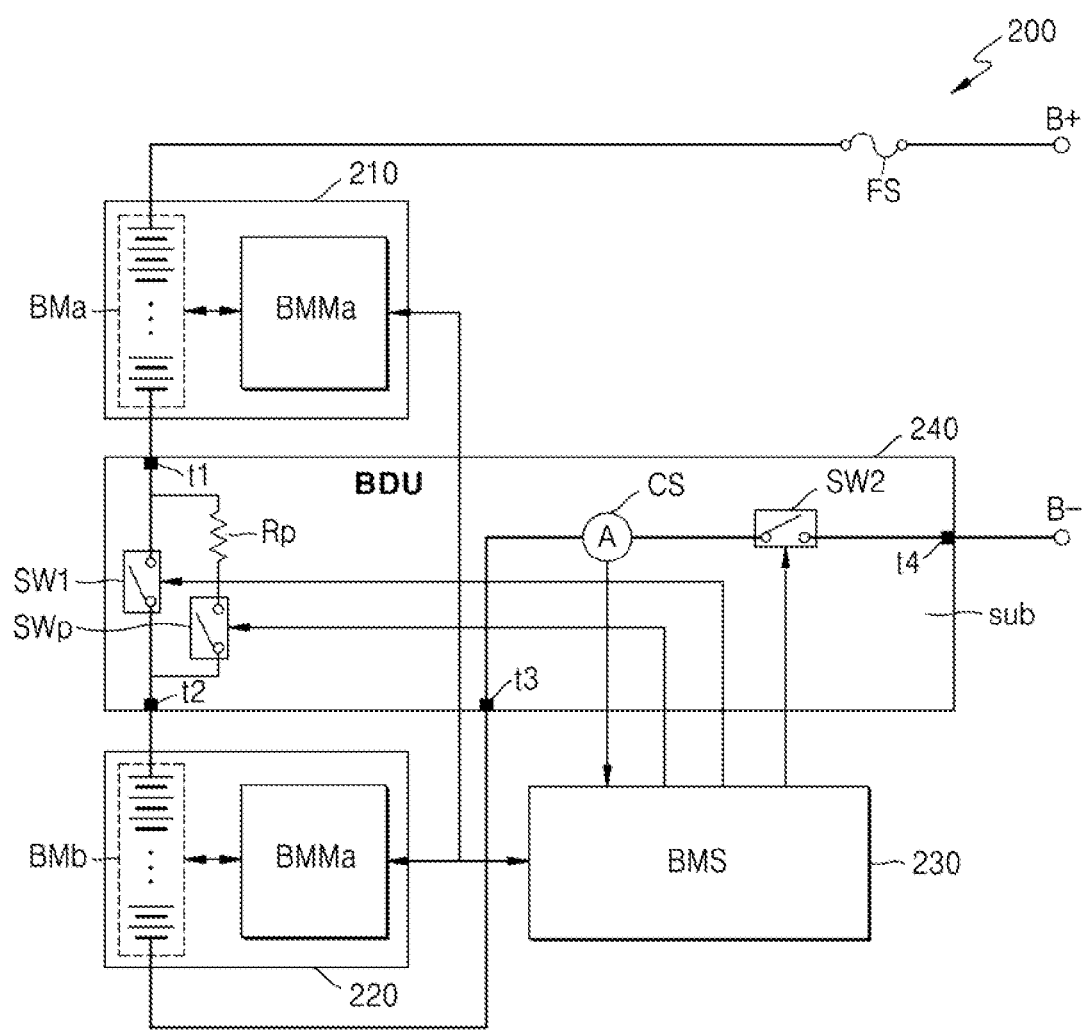
FIG. 2 is a block diagram of a battery system according to an example embodiment.

FIG. 2 is a block diagram of a battery system according to an example embodiment.

Referring to FIG. 2, a battery system 200 may include a first battery module 210 including a plurality of first battery cells BMa, a second battery module 220 including a plurality of second battery cells BMb, and a battery disconnection unit (BDU) 240 connected between the first battery module 210 and the second battery module 220.

The battery disconnection unit 240 may include a first main switch SW1 connected in series between the first battery cells BMa of the first battery module 210 and the second battery cells BMb of the second battery module 220, and a precharge switch SWp and a precharge resistor Rp connected in series with each other, and connected in parallel with the first main switch SW1.

The battery system 200 may include a first battery terminal B+ connected to the first battery module 210 and a second battery terminal B− connected to the second battery module 220. According to an example embodiment, the first battery terminal B+ may have a higher electric potential than the second battery terminal B−. However, this is just an example and the terminals may be the opposite. According to an example embodiment, the second battery terminal B− may be connected to a ground. However, this is just an example, and the first battery terminal B+ may be connected to the ground. In the following description, it is assumed that the first battery terminal B+ has a higher electric potential than the second battery terminal B−. A path between the first battery module 210 and the first battery terminal B+ is referred to as a high voltage path, and a path between the second battery module 220 and the second battery terminal B− is referred to as a low voltage path.

When the battery system 200 operates normally, a voltage between the first battery terminal B+ and the second battery terminal B− may be several hundred volts or more. For example, the voltage between the first battery terminal B+ and the second battery terminal B− may have the magnitude of about 400 V to about 800 V. Herein, the voltage between the first battery terminal B+ and the second battery terminal B− is referred to as a system voltage.

The first and second battery terminals B+ and B− may be connected to a load such as an electric motor, which is driven by using power stored in the battery system 200, or may be connected to power devices such as generators, rectifiers, or converters for supplying power to the battery system 200.

The first and second battery cells BMa and BMb, in which power is stored, may be connected in series with each other to configure the first and second battery modules 210 and 220. The first and second battery cells BMa and BMb may be rechargeable secondary batteries. For example, the first and second battery cells BMa and BMb may include at least one selected from the group of a lithium ion battery, a lithium polymer battery, a nickel cadmium battery, a nickel metal hydride (Ni-MH) battery, a nickel-zinc (Ni—Zn) battery, and a lead acid battery. The number of the first and second battery cells BMa and BMb of the battery system 200 and the connection configuration thereof may be determined according to an output voltage and a charge/discharge capacity.

In FIG. 2, each of the first battery module 210 and the second battery module 220 is shown as being one. However, this is just an example, and each of the first battery module 210 and the second battery module 220 may include a plurality of battery modules.

The first battery module 210, the first main switch SW1 of the battery disconnection unit 240, and the second battery module 220 may be connected in series with one another so that the electric potential of the first main switch SW1 of the battery disconnection unit 240 with respect to the second battery terminal B− is approximately half of the electric potential of the first battery terminal B+, and a first module voltage of the first battery module 210 and a second module voltage of the second battery module 220 may have substantially the same magnitude.

According to an example embodiment, a rated module voltage of the first battery module 210 and a rated module voltage of the second battery module 220 may have substantially the same magnitude. The first and second battery modules 210 and 220 may have the rated module voltage with the same magnitude. According to another example embodiment, the first battery cells BMa of the first battery module 210 and the second battery cells BMb of the second battery module 220 may have the same specifications, the same number, and the same connection configuration. In this case, an electric component, for example, a relay or a power semiconductor switch having a dielectric and used in the first main switch SW1, may be specified to withstand of about half the magnitude relative to the comparative example. Thus, compared to the related art, manufacturing cost may be reduced.

The first main switch SW1 of the battery disconnection unit 240 may connect or disconnect a path between the first battery module 210 and the second battery module 220. The first main switch SW1 may be shorted so as to charge or discharge the first battery cells BMa and the second battery cells BMb. When the first battery cells BMa and the second battery cells BMb are over-charged or discharged or in a high temperature state, the first main switch SW1 may be opened to protect the first battery cells BMa and the second battery cells BMb.

The precharge switch SWp and the precharge resistor Rp may prevent the battery system 200, the load, or the power device from being damaged by an inrush current that flows when the load or power device is suddenly connected to the first and second battery terminals B+ and B−. The precharge switch SWp may be shorted (e.g., closed or placed in a conductive state) first, before the first main switch SW1 is shorted, so that the magnitude of the inrush current may be limited by the precharge resistor Rp. When current flowing through the precharge resistor Rp is less than or equal to a preset magnitude, the first main switch SW1 may be shorted, and the precharge switch SWp may be opened.

The battery disconnection unit 240 may further include a second main switch SW2 arranged on a low voltage path between the second battery cells BMb and the second battery terminal B−. When the first main switch SW1 is not controlled by a failure or the like, the second main switch SW2 may be opened to protect the battery system 200. Although the second main switch SW2 is arranged on the low voltage path, the second main switch SW2 may be arranged on the high voltage path.

The first main switch SW1, the second main switch SW2, and the precharge switch SWp may be configured as a relay switch or a power transistor.

The battery disconnection unit 240 may include a current sensor CS arranged on the low voltage path between the second battery cells BMb and the second battery terminal B−. The current sensor CS may detect the magnitude of a charge/discharge current that flows through the second battery terminal B−, the second battery module 220, the first battery module 210, and the first battery terminal B+. The current sensor CS may output a signal corresponding to the magnitude of the charge/discharge current. The current sensor CS may include a shunt resistor, for example. In this case, the current sensor CS may output a voltage signal corresponding to the magnitude of the charge/discharge current. Although the current sensor CS is arranged on the low voltage path, the current sensor CS may be arranged on the high voltage path.

The battery disconnection unit 240 may include a substrate ("sub") having first through terminals t1 to t4. The first terminal t1 may be connected to a negative terminal of the first battery cells BMa. The second terminal t2 may be connected to a positive terminal of the second battery cells BMb. The third terminal t3 may be connected to the positive terminal of the second battery cells BMb. The fourth terminal t4 may be connected to the second battery terminal B−.

The first main switch SW1, the second main switch SW2, the precharge switch SWp, the precharge resistor Rp, and the current sensor CS may be mounted on the substrate sub. The first main switch SW1 may be connected between the first and second terminals t1 and t2. The precharge switch SWp and the precharge resistor Rp may be connected between the first and second terminals t1 and t2. The second main switch SW2 and the current sensor CS may be connected between the third and fourth terminals t3 and t4.

The battery system 200 may further include a fuse FS, which may prevent an overcurrent from flowing. The fuse FS may be arranged on the high voltage path. However, the fuse FS may be arranged on the low voltage path.

The battery system 200 may include a battery management system 230 that controls the first main switch SW1, the second main switch SW2, and the precharge switch SWp, and receives a signal corresponding to the magnitude of the charge/discharge current from the current sensor CS. For example, the battery management system 230 may receive a signal from the current sensor CS, may detect the magnitude of the charge/discharge current, and may determine that the magnitude of the charge/discharge current exceeds a preset over-current setting value, in which event at least one of the first main switch SW1 and the second main switch SW2 may be opened.

When the load or power device is connected to the first and second battery terminals B+ and B−, the battery management system 230 may open the first main switch SW1, and the second main switch SW2 and the precharge switch SWp may be shorted. The battery management system 230 may detect the magnitude of current that flows through the precharge resistor Rp by using the current sensor CS, and when the magnitude of the current is less than a preset setting value, the battery management system 230 may short the first main switch SW1 and may open the precharge switch SWp.

The first battery module 210 may include a first module management unit BMMa that monitors the first battery cells BMa. The second battery module 220 may include a second module management unit BMMb that monitors the second battery cells BMb.

Each of the first and second module management units BMMa and BMMb may detect a cell voltage and temperature of each of the first and second battery cells BMa and BMb, and may equally adjust cell voltages of the first and second battery cells BMa and BMb according to a preset cell balancing algorithm. For this cell balancing operation, each of the first and second module management units BMIMa and BMMb may include a cell balancing circuit.

The first and second module management units BMMa and BMMb may transmit monitoring data to the battery management system 230, and may receive a control command or the like from the battery management system 230. The first and second module management units BMMa and BMMb and the battery management system 230 may perform data communication with each other by using a controller area network (CAN) bus, for example.

The battery management system 230 may stably disconnect a high voltage and a high current input and output between the battery system 200 and power devices such as an inverter and a DC/DC converter using the battery disconnection unit 240. When an overcurrent occurs (e.g., due to unintended external collision or internal circuit malfunction), the battery management system 230 may quickly detect the overcurrent by using the current sensor CS and may quickly open the first and second main switches SW1 and SW2, thereby protecting the battery system 200.

The battery management system 230 may monitor the cell voltages of the first and second battery cells BMa and BMb, the module voltages of the first and second battery modules 210 and 220, the system voltages between the first and second battery terminals B+ and B−, and temperatures of the first and second battery modules 210 and 220. The battery management system 230 may control and manage the overall operation of the battery system 200 according to a preset management control algorithm.

When the load and the power devices are separated from the first and second battery terminals B+ and B−, the battery management system 230 may open the first main switch SW1 and the precharge switch SWp, thereby electrically separating the first battery module 210 and the second battery module 220 from each other. According to another example embodiment, the battery management system 230 may open the second main switch SW2.

A user may disassemble the battery system 200 for reasons such as maintenance, e.g., when a failure occurs in the battery system 200 or at least one of the battery modules 210 and 220 is deteriorated and is to be replaced. The user may separate the load and the power devices connected to the battery system 200 from the first and second battery terminals B+ and B−. The battery management system 230 may detect separation of the load and the power devices to open the first main switch SW1 and the precharge switch SWp and to electrically separate the first battery module 210 and the second battery module 220 from each other, thereby performing the function of the manual safety disconnector 150 described with reference to FIG. 1. The user may then perform tasks such as checking the battery system 200 or replacing the battery modules 210 and 220.

In the comparative example, the user manually separates the manual safety disconnector 150. However, according to the present example embodiment described in connection with FIG. 2, the first battery module 210 and the second battery module 220 may be automatically separated from each other by the battery disconnection unit 240, so that operational convenience may be enhanced.

The position of the battery disconnection unit 240 may be changed between the first and second battery modules 210 and 220, so that the function of the manual safety disconnector 150 according to the comparative example may be performed by the battery disconnection unit 240. Thus, the battery system 200 may be not equipped with the manual safety disconnector 150. Thus, manufacturing cost may be reduced by the cost of the manual safety disconnector 150, and the volume of the device may be reduced.

By way of summation and review, when a high output voltage is desired, a battery module may be configured by connecting a plurality of battery cells in series. A battery module may also be configured by connecting a plurality of battery cells in parallel according to the charge/discharge capacity of the battery module. In addition, when a high output voltage of several hundred volts or more is called for, a battery system may be configured by connecting a plurality of battery modules in series. The number and connection configuration of battery cells that constitute the battery system may be variously set according to the desired output voltage and charge/discharge capacity.

As described above, embodiments may provide a battery system that does not include a manual safety disconnector (MSD). In a battery system according to an example embodiment, the function of the manual safety disconnector (MSD) may be substituted by using a switch controlled by a battery management system so that cost, complexity, and volume may be reduced. In addition, since manually separating the battery modules may be avoided, convenience and safety of operation may both be increased.

As set forth herein, for the sake of brevity, general electronics, control systems, software development, and other functional aspects of the systems (and components of the individual operating components of the systems) may not be described in detail. Furthermore, the connection lines, or connectors shown in the various figures are intended to represent example functional relationships and/or physical or logical couplings between the various elements. It should be noted that alternative or additional functional relationships, physical connections, or logical connections may be present in a practical device. Moreover, no item or component is essential to the practice of the present disclosure unless the element is specifically described as "essential" or "critical."

In the specification, the use of the terms "a," "an," and "the" and similar referents are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Further, the steps of all methods described herein may be performed in any suitable order unless otherwise indicated herein or otherwise clearly contradicted by context. The disclosure is not limited according to the description order of the steps. The use of any and all examples, or example language (e.g., "such as") provided herein, is intended merely to better illuminate the embodiments and does not pose a limitation on the scope thereof unless otherwise specified.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
a first battery module including a plurality of first battery cells and a first module management unit to monitor the plurality of first battery cells;
a first battery terminal connected to the plurality of first battery cells;
a second battery module including a plurality of second battery cells and a second module management unit to monitor the plurality of second battery cells;
a second battery terminal connected to the plurality of second battery cells;
a battery management unit configured to transmit data to and receive data from the first module management unit and the second module management unit;
a battery disconnection unit connected between the first battery module and the second battery module and between the second battery module and the second battery terminal, wherein:
the battery disconnection unit includes:
a single substrate including a first terminal connected to a negative terminal of the first battery module, a second terminal connected to a positive terminal of the second battery module, a third terminal connected to a negative terminal of the second battery module, and a fourth terminal connected to the second battery terminal,
a first main switch mounted on the single substrate and connected between the first terminal and the second terminal;
a precharge switch and a precharge resistor mounted on the single substrate and connected in series between the first terminal and the second terminal;

a second main switch mounted on the single substrate and connected between the third terminal and the fourth terminal; and a current sensor mounted on the single substrate and connected in series with the second main switch to detect a magnitude of current through the second main switch, and the battery management system is configured to control the first main switch, the second main switch and the precharge switch.

2. The battery system as claimed in claim 1, wherein:

the plurality of first battery cells is connected in series between the first terminal and the first battery terminal, and the plurality of second battery cells is connected in series between the second terminal and the third terminal.

3. The battery system as claimed in claim 1, wherein the battery management system directly controls the first main switch, the second main switch and the precharge switch.

4. The battery system as claimed in claim 3, wherein:

the battery system directly controls the first main switch via a single connection between the battery management system and the first main switch, the battery system directly controls the second main switch via a single connection between the battery management system and the second main switch, the battery system directly controls the precharge switch via a single connection between the battery management system and the precharge switch.

5. The battery system as claimed in claim 1, wherein the plurality of first battery cells included in the first battery module and the plurality of second battery cells included in the second battery module have a same connection configuration.

6. The battery system as claimed in claim 1, wherein a rated module voltage of the first battery module and a rated module voltage of the second battery module have substantially the same magnitude.

7. The battery system as claimed in claim 1, wherein a manual safety disconnector is not included between the first battery module and second battery module.

8. The battery system as claimed in claim 1, wherein:

the current sensor is connected between the third terminal and the fourth terminal, and the battery management system is configured to receive a signal corresponding to the magnitude of current detected by the current sensor.

9. The battery system as claimed in claim 1, further comprises a fuse between the first battery module and the first battery terminal.

* * * * *